No. 617,536. Patented Jan. 10, 1899.
W. L. MARTIN.
BICYCLE.
(Application filed June 11, 1898.)
(No Model.)
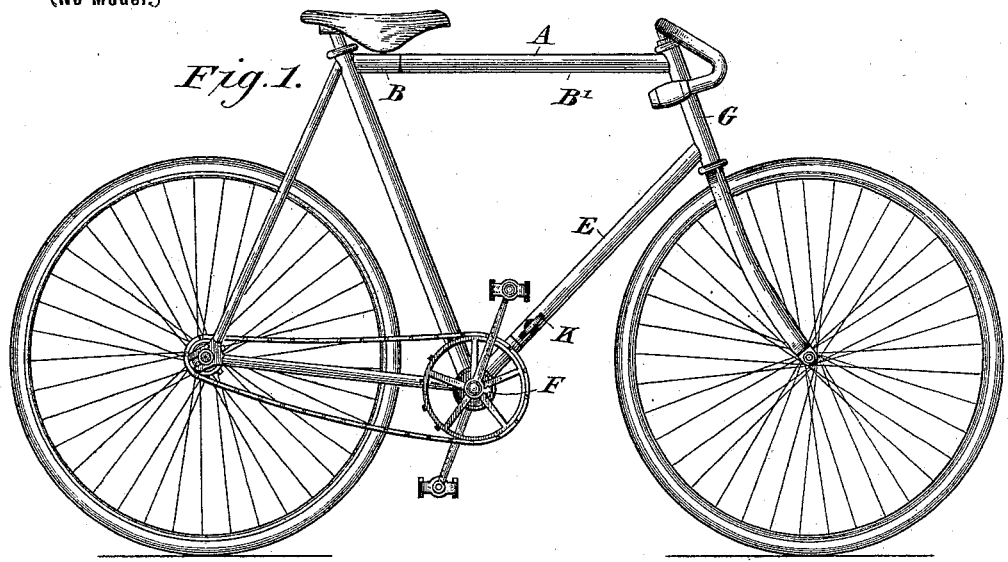
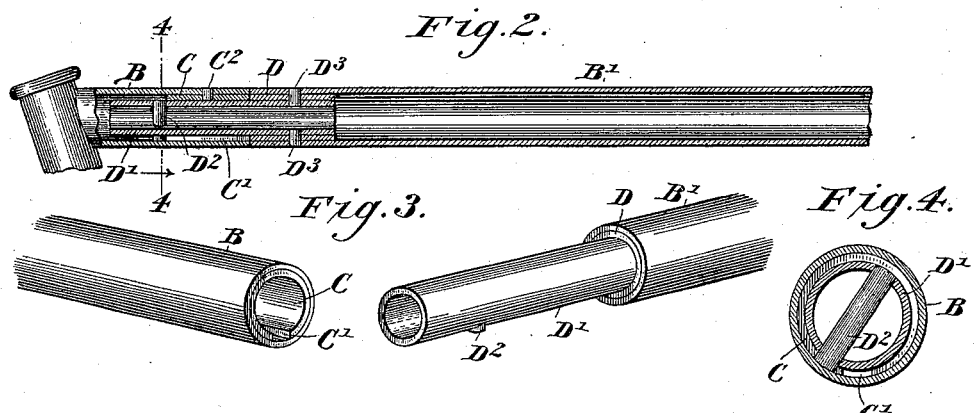
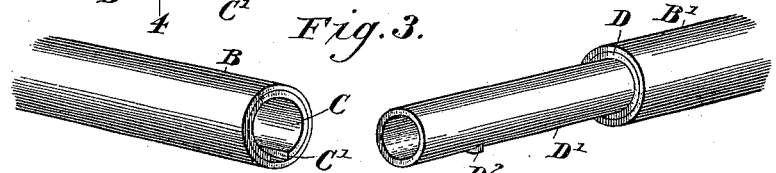
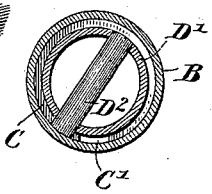
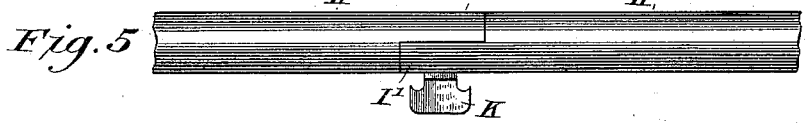
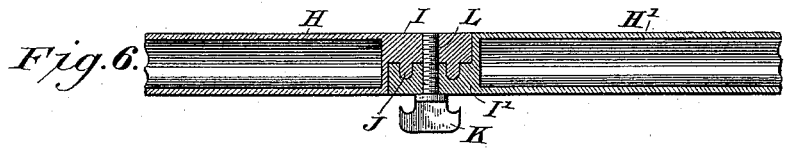
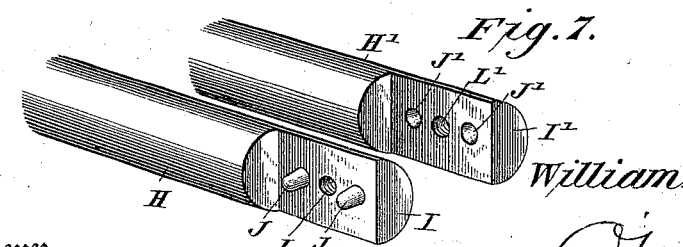
Inventor
William L. Martin,
by O'Mara & Co.
Attorneys
Witnesses
J. M. Witherow
Chas. O. Brock

UNITED STATES PATENT OFFICE.

WILLIAM L. MARTIN, OF RANCOCAS, NEW JERSEY.

BICYCLE.

SPECIFICATION forming part of Letters Patent No. 617,536, dated January 10, 1899.

Application filed June 11, 1898. Serial No. 683,224. (No model.)

*To all whom it may concern:*

Be it known that I, WILLIAM L. MARTIN, a citizen of the United States, residing at Rancocas, in the county of Burlington and State of New Jersey, have invented a new and useful Bicycle, of which the following is a specification.

This invention relates to bicycles, the object being to construct the bicycle-frame so that the portions thereof carrying the front wheel and the rear wheel and driving mechanism may be separated for the purpose of packing the bicycle for storage or transportation.

With this object in view the invention consists of a frame the top bar and front brace of which are made in sections, the improved construction, arrangement, and combination of the parts thereof being fully described hereinafter and afterward specifically pointed out in the claims.

In order to enable others skilled in the art to which my invention most nearly appertains to make and use the same, I will now proceed to describe its construction and operation, having reference to the accompanying drawings, in which—

Figure 1 is a view in side elevation of a bicycle constructed in accordance with my invention. Fig. 2 is a vertical sectional view through the top bar, the upper end of the seat-post being shown in elevation. Fig. 3 is a detail perspective view of the meeting ends of the two parts of the separable top bar detached from each other. Fig. 4 is a sectional view on the line 4 4 of Fig. 2. Fig. 5 is a fragmentary detail view of the meeting ends of the two parts of the front brace secured together. Fig. 6 is a vertical sectional view through the same, and Fig. 7 is a fragmentary detail view illustrating the two parts separated.

Like letters of reference indicate the same parts in all the figures of the drawings.

In referring to the drawings by letters only those parts of the bicycle will be mentioned which have special relation to my invention.

A indicates the top bar of the well-known diamond frame of a bicycle. The top bar in this instance is composed of two sections B and B', the former being connected to that portion of the bicycle-frame which carries the rear wheel and driving mechanism and the latter to that portion which carries the front wheel and steering mechanism. The section B is reinforced by an interior short tube or thimble C, longitudinally slotted at C' and extending from the meeting end rearwardly for some distance, being secured to the section B by means of a rivet $C^2$. The section B' consists of a single tube for the greater part of its length, but provided at its meeting end with a reinforcing inner sleeve D, in which is fitted a tube D' of any proper size to snugly fit within the sleeve C in the end B, and provided with a pin $D^2$ to enter the longitudinal slot C', that portion of the tube D' between the pin $D^2$ and the end of the section B' and sleeve D being slightly longer than the length of the inner slotted sleeve C of the section B, so that when the tube D' is inserted far enough into the section B to bring the meeting ends of that section and the section B' together the pin $D^2$ will have passed beyond the inner end of the sleeve C and may be turned to engage behind the inner end of the sleeve and prevent the two sections from being pulled apart, as best shown in Fig. 4. The section B', sleeve D, and tube D' are secured together by rivets $D^3$.

E indicates the front brace, which, as is usual, connects the crank-hanger F with the steering-post G. This brace is composed of two sections H and H', which are tubular for the greater part of their length, but formed solid for a sufficient length at their meeting ends to make a rigid joint. The section H is provided with a semicylindrical solid end I and the section H' with a similar semicylindrical solid end I', these ends, when brought together, forming a halved lap-joint. The end I is provided on its flat inner face with projections J and the end I' with recesses J', into which said projections enter when the two ends are brought together. A thumbscrew K is threaded into openings L and L' in the solid ends I and I' to hold the parts rigidly together.

When the bicycle is set up for use, as in Fig. 1, the pin $D^2$ of section B' of the top bar stands at about the angle illustrated in Fig.

4, being turned out of line with the slot C' and engaging behind the inner end of the sleeve C. In order to separate the two parts of the bicycle, it will be necessary to turn the section B' to bring the pin D² in line with the slot C', so that the tube D' may be slipped out of the sleeve C. This cannot be accomplished while the two sections of the front brace E are secured together. Therefore in order to separate the front and rear portions of the frame the thumb-screw K must be turned out sufficiently far to disengage itself from the opening L in the solid end J of the section H, which will permit of the turning of the whole front portion of the frame, including the section B' of the top part, bringing the pin D² into line with the slot C', so that the tube may be withdrawn out of the section B, leaving the front part of the frame separate from the rear part, so that they may be packed into a smaller compass than when secured together.

To set up the bicycle for use again, the operation of separating the parts, as before described, is reversed, the tube D' being inserted in the sleeve C, with the pin D² in the slot C', and pressed inward until the pin D² passes beyond the inner end of the sleeve C, as before described, when the section B' is turned, locking the pin D² behind the inner end of the sleeve C and bringing the sections H and H' of the front brace E together, to be secured by turning in the thumb-screw K.

From the foregoing it will be seen that I have produced a very cheap and simple bicycle-frame which may be quickly and readily separated into two parts, whereby it may be closely packed for storage or transportation, taking much less room than a non-separable frame.

Having thus fully described my invention, what I claim as new, and desire to secure by Letters Patent of the United States, is—

1. In a bicycle, the top bar A consisting of two separable sections, the section B being provided at its meeting end with an inner reinforcing-sleeve C having a slot C', and the section B' being provided with a projecting tube D' of the size to fit within the sleeve C, and a pin D² projecting laterally from the tube D' to engage in the slot C' when the tube D' is placed in the sleeve C, in combination with the front brace E made in two sections, provided with a joint adapted to come together laterally and fastening means for said joint, the pin D² being placed at a proper angle to cause it to lock behind the inner edge of the sleeve C when the two sections of the front brace E are brought together, substantially as described.

2. In a bicycle, a telescoping joint consisting of a frame-bar in separable sections, the one section being provided at its meeting end with the inner reinforcing-sleeve having a slot, and the other section being provided with a projecting tube of the size to fit within the said sleeve, and a pin projecting laterally from the said tube to engage in the said slot when the tube is placed in the sleeve to pass beyond the end of said slot and to turn in the frame-section to prevent endwise displacement.

WILLIAM L. MARTIN.

Witnesses:
  EDWIN F. MANUEL,
  WILLIAM T. SMITH.